United States Patent
Best et al.

(10) Patent No.: US 9,280,431 B2
(45) Date of Patent: Mar. 8, 2016

(54) PRIORITIZING BACKUPS ON A DISK LEVEL WITHIN ENTERPRISE STORAGE

(71) Applicant: GlobalFoundries Inc., Grand Cayman (KY)

(72) Inventors: Steven F. Best, Groton, MA (US); Janice M. Girouard, Austin, TX (US); Yehuda Shiran, Haifa (IL)

(73) Assignee: GLOBALFOUNDRIES INC., Grand Cayman (KY)

( * ) Notice: Subject to any disclaimer, the term of this patent is extended or adjusted under 35 U.S.C. 154(b) by 269 days.

(21) Appl. No.: 13/865,083

(22) Filed: Apr. 17, 2013

(65) Prior Publication Data

US 2014/0317446 A1  Oct. 23, 2014

(51) Int. Cl.
*G06F 11/00* (2006.01)
*G06F 11/20* (2006.01)

(52) U.S. Cl.
CPC ........ *G06F 11/2082* (2013.01); *G06F 11/2005* (2013.01); *G06F 11/2043* (2013.01); *G06F 11/2089* (2013.01)

(58) Field of Classification Search
CPC .................................................. G06F 11/2005
See application file for complete search history.

(56) References Cited

U.S. PATENT DOCUMENTS

| | | | |
|---|---|---|---|
| 5,727,144 A | 3/1998 | Brady et al. | |
| 5,852,271 A * | 12/1998 | Offer | B23K 26/122 219/72 |
| 6,223,252 B1 * | 4/2001 | Bandera et al. | 711/114 |
| 6,249,887 B1 * | 6/2001 | Gray et al. | 714/47.2 |
| 6,418,068 B1 * | 7/2002 | Raynham | 365/200 |
| 6,598,174 B1 * | 7/2003 | Parks et al. | 714/6.22 |
| 6,752,233 B1 * | 6/2004 | Shakespear | 180/248 |
| 6,941,347 B2 * | 9/2005 | Yoshimura | 709/206 |
| 7,133,966 B2 * | 11/2006 | Sato et al. | 711/114 |
| 7,313,721 B2 * | 12/2007 | Ashmore | 714/6.32 |
| 7,353,423 B2 | 4/2008 | Hartline et al. | |
| 7,434,097 B2 | 10/2008 | Guha et al. | |
| 7,480,780 B2 | 1/2009 | Kitamura | |
| 7,500,136 B2 * | 3/2009 | Miyoshi et al. | 714/6.21 |
| 7,525,749 B2 | 4/2009 | Maejima et al. | |
| 7,533,292 B2 * | 5/2009 | Van Gundy et al. | 714/6.32 |
| 7,543,178 B2 | 6/2009 | McNeill et al. | |
| 7,574,623 B1 | 8/2009 | Goel et al. | |
| 7,587,626 B2 | 9/2009 | Terry et al. | |
| 7,590,801 B1 | 9/2009 | Gavarre et al. | |
| 7,603,530 B1 * | 10/2009 | Liikanen et al. | 711/162 |
| 7,603,583 B2 * | 10/2009 | Yamamoto et al. | 714/6.32 |
| 7,644,304 B2 * | 1/2010 | Kotzur et al. | 714/6.11 |
| 7,739,544 B2 * | 6/2010 | Yamato et al. | 714/6.32 |
| 7,779,202 B2 | 8/2010 | Tanaka et al. | |
| 7,941,628 B2 * | 5/2011 | Kalos et al. | 711/170 |

(Continued)

Primary Examiner — Amine Riad

(57) ABSTRACT

A system, method, and computer program product provide a process that includes storing data on first data storage devices, and a backup copy of the data on the first and/or on second ones of the data storage devices. A probability of a failure of each of at least some of the first and/or second data storage devices is determined, and at least one of the first and/or data storage devices that is determined to have a higher probability of failure than a threshold and/or a probability of failure of another of the data storage devices, is selected. A second backup copy of the data, stored on the selected data storage device(s), is also stored on third ones of the data storage devices. The first and/or second data storage devices determined to have the higher probability of failure are used for their designated purpose after the second backup copy is created.

20 Claims, 5 Drawing Sheets

(56) References Cited

U.S. PATENT DOCUMENTS

| | | |
|---|---|---|
| 7,975,171 B2 | 7/2011 | Haustein et al. |
| 8,028,202 B2 | 9/2011 | Takagi et al. |
| 8,051,339 B2 * | 11/2011 | Sung et al. .................... 714/710 |
| 8,176,359 B2 | 5/2012 | Ishikawa et al. |
| 8,185,784 B2 * | 5/2012 | McCombs et al. ........... 714/47.2 |
| 8,291,263 B2 * | 10/2012 | Li et al. ........................... 714/26 |
| 8,392,752 B2 * | 3/2013 | Ikeuchi et al. ............... 714/6.22 |
| 8,677,037 B1 * | 3/2014 | Karamcheti ........ G06F 13/1657 710/62 |
| 2002/0162057 A1 * | 10/2002 | Talagala ......................... 714/54 |
| 2005/0166084 A1 * | 7/2005 | Yagisawa et al. ................. 714/6 |
| 2005/0283655 A1 | 12/2005 | Ashmore |
| 2011/0264949 A1 * | 10/2011 | Ikeuchi et al. ............... 714/6.22 |
| 2012/0110584 A1 * | 5/2012 | Chaudhry ............. G06F 9/5027 718/102 |
| 2014/0304560 A1 * | 10/2014 | Narasimha .......... G06F 11/0727 714/704 |

* cited by examiner

PRIORITIZING BACKUPS ON A DISK LEVEL WITHIN ENTERPRISE STORAGE

BACKGROUND

The present invention relates to data storage, and more specifically, this invention relates to data storage having prioritized backups on a disk level within a storage system having multiple data storage devices.

Disk errors in enterprise storage, e.g., large storage products, may result from a number of different causes including hardware failures (e.g., physical disk and/or adapter), an unsupported disk model and/or firmware level, operating system failures, erroneous storage application code, etc. Thus, while some errors may be caused by a more serious situation, others may simply result from normal disk operation.

Moreover, when a disk error occurs, the disk may issue an 'alert' regardless of how serious the error. However, it would be unfavorable if the storage system failed every disk that had an error, as this would increase operation costs, decrease efficiency, etc. Therefore, conventional products must determine whether a disk is actually faulty, or just experiencing errors typical of normal disk operation.

As a result, conventional products maintain two copies of data on a given disk such that, if the primary copy of the data is lost or corrupted for any reason, the backup copy is used to replace the data. However, this scheme reduces the overall capacity of conventional storage systems to 50% of the disk capacity. Furthermore, it is still possible to lose both copies of the data, or to find that the two copies of the data differ without a clear understanding of which of the two values is the correct value.

BRIEF SUMMARY

A method according to one embodiment includes communicating with a plurality of data storage devices. Data is caused to be stored on first ones of the data storage devices. A backup copy of the data is stored on the first and/or on second ones of the data storage devices. A probability of a failure of each of at least some of the first and/or second data storage devices is determined, and at least one of the first and/or data storage devices that is determined to have a higher probability of failure than at least one of: A) a threshold, and B) a probability of failure of another of the data storage devices, is selected. A second backup copy of the data, stored on the selected at least one of the first and/or second data storage devices, is stored on third ones of the data storage devices. At least one of the first and/or second data storage devices determined to have the higher probability of failure is used for a designated purpose thereof after the second backup copy of the data is created.

A system according to one embodiment includes a manager configured to communicate with a plurality of data storage devices. The manager includes hardware for communicating with the plurality of data storage devices, and logic configured to perform various steps of the foregoing method.

A computer program product according to one embodiment includes a computer readable storage medium having program code embodied therewith, the program code readable/executable by a processor to perform, by the processor, various steps of the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
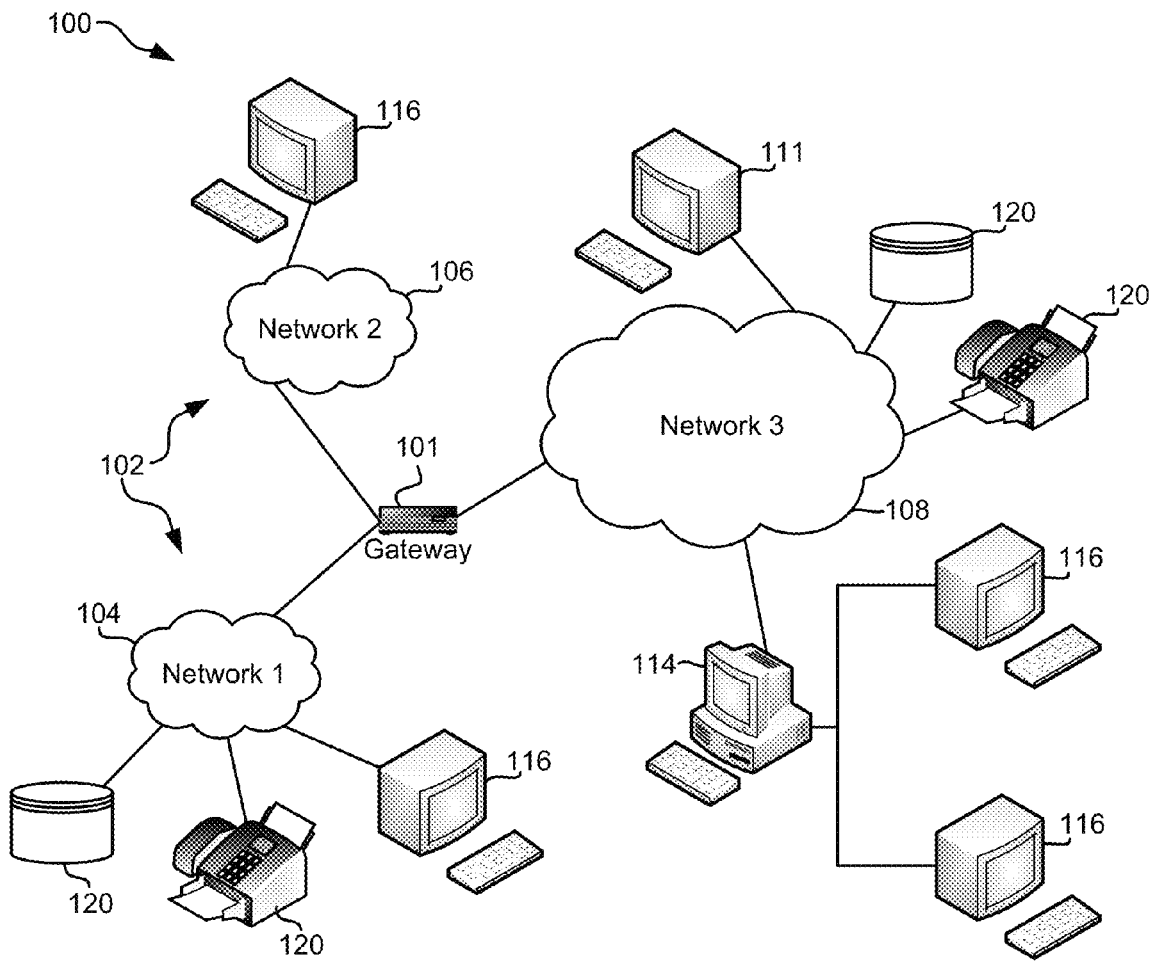
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

At a high level, the following description discloses several preferred embodiments of systems, methods and computer program products that identify a data storage device such as a disk or disks in a storage system that are deemed most likely to fail. For the data storage device(s) deemed most likely to fail, the data on the data storage device(s) deemed most likely to fail is automatically copied to one or more 'spare' (e.g., reserve) data storage devices in the storage system.

In one general embodiment, a method includes communicating with a plurality of data storage devices. Data is caused to be stored on first ones of the data storage devices. A backup copy of the data is stored on the first and/or on second ones of the data storage devices. A probability of a failure of each of at least some of the first and/or second data storage devices is determined, and at least one of the first and/or data storage devices that is determined to have a higher probability of failure than at least one of: A) a threshold, and B) a probability of failure of another of the data storage devices, is selected. A second backup copy of the data, stored on the selected at least one of the first and/or second data storage devices, is stored on third ones of the data storage devices. At least one of the first and/or second data storage devices determined to have the higher probability of failure is used for a designated purpose thereof after the second backup copy of the data is created.

In another general embodiment, a system includes a manager configured to communicate with a plurality of data storage devices. The manager includes hardware for communicating with the plurality of data storage devices, and logic configured to perform various steps of the foregoing method.

In another general embodiment, a computer program product includes a computer readable storage medium having program code embodied therewith, the program code readable/executable by a processor to perform, by the processor, various steps of the foregoing method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
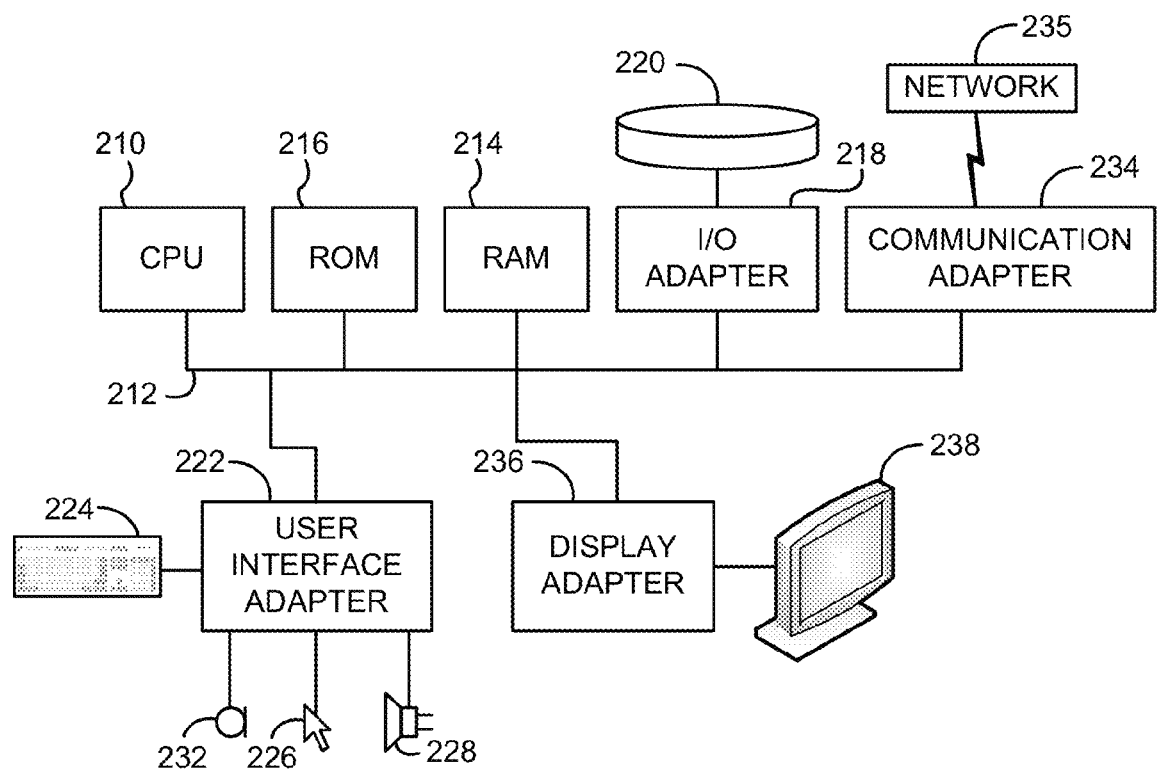
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
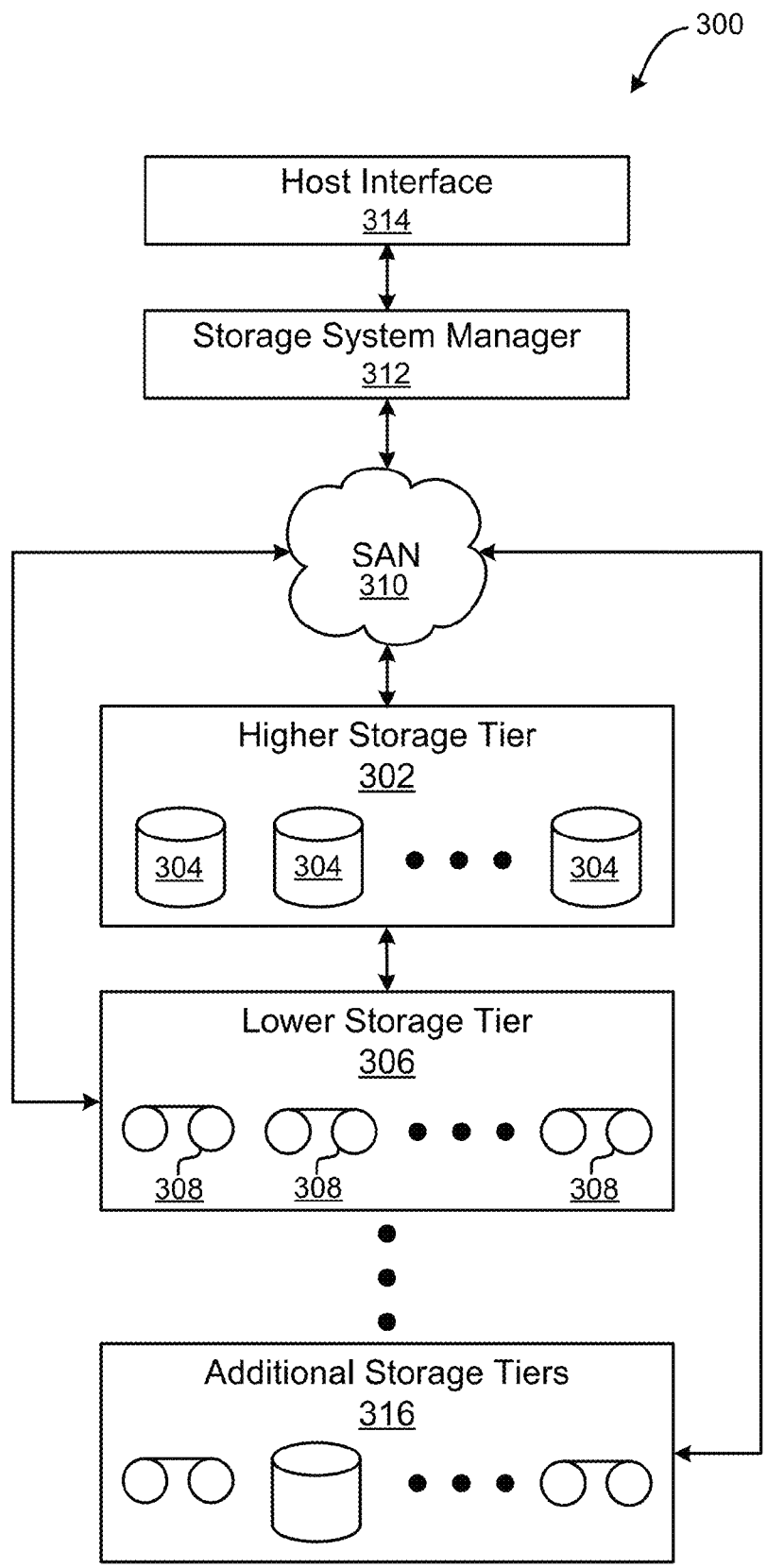
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on a higher storage tier 302 and a lower storage tier 306. The higher storage tier 302 preferably may include one or more random access and/or direct access media 304, such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media. The storage system manager 312 may communicate with the storage media 304, 308 on the higher and lower storage tiers 302, 306 through a network 310, such as a storage area network (SAN), as shown in FIG. 3. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

Various embodiments described and/or suggested herein preferably include identifying the disks most likely to fail, and creating a third backup copy, e.g., backup of the disks' data. This may preferably increase free disk space, reliability of data storage, security of data, etc. of data storage systems, including, but not limited to enterprise storage systems.

Figure 4:
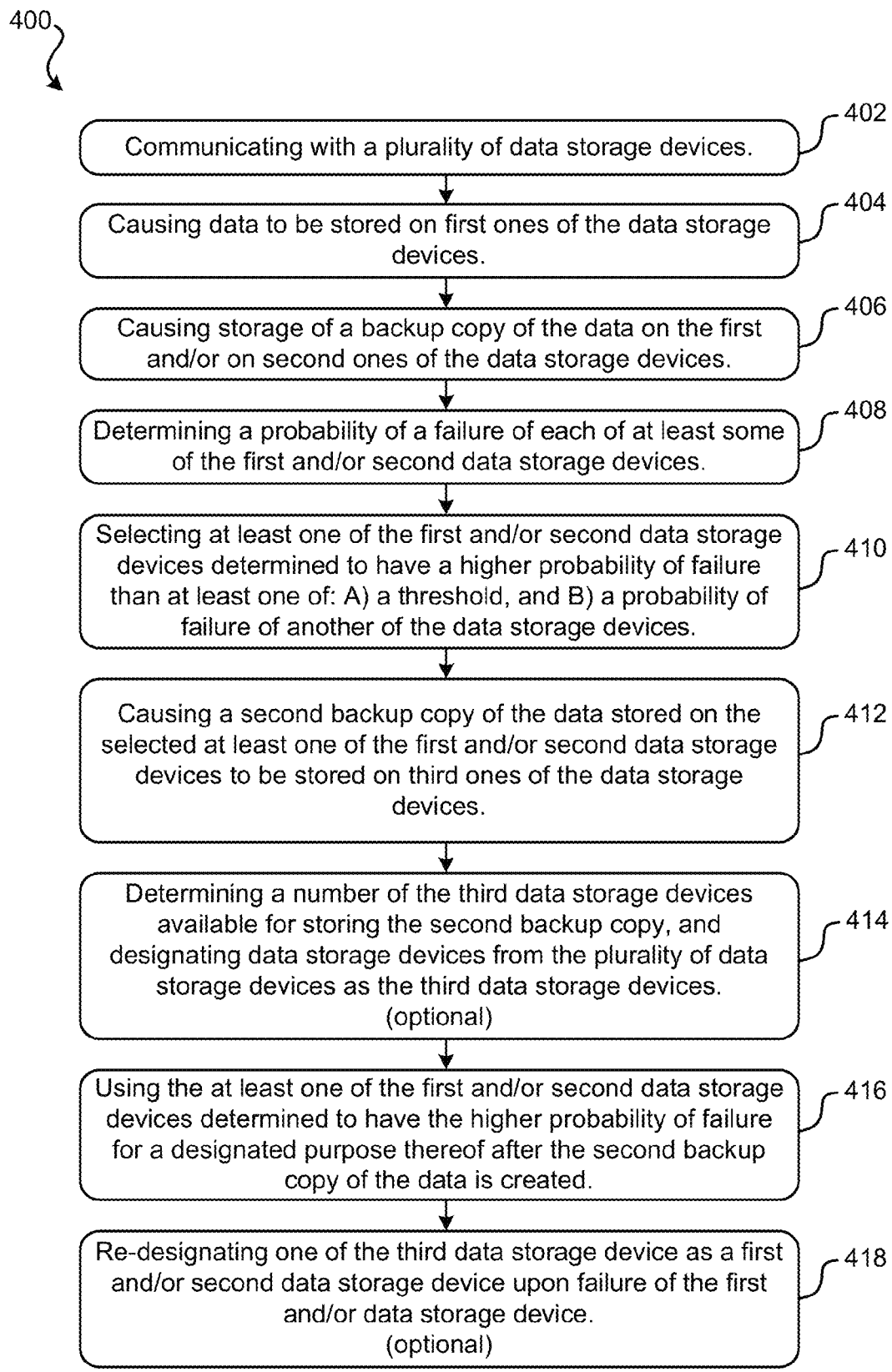
FIG. 4 illustrates a flowchart of a method in accordance with one embodiment.

FIG. 4 depicts a method 400 in accordance with one embodiment. As an option, the present method 400 may be implemented in conjunction with features from any other embodiment listed herein, such as those described with reference to the other FIGS. Of course, however, such method 400 and others presented herein may be used in various applications and/or in permutations which may or may not be specifically described in the illustrative embodiments listed herein. Further, the method 400 presented herein may be used in any desired environment.

The method may be implemented in conjunction with a manager configured to communicate with a plurality of data storage devices (see, e.g., 312 of FIG. 3). The manager may include hardware for communicating with the plurality of data storage devices, and logic configured to perform the method 400 of FIG. 4. Moreover, a predefined percentage of the data storage devices in the system may be designated as 'spares' (e.g., on reserve, hereinafter referred to as third data storage devices) for use in creating a redundant, second backup copy of data, and/or for replacing a data storage device when one of the primary data storage devices fails.

Referring now to FIG. 4, the method 400 includes communicating with a plurality of data storage devices. See operation 402. In one approach, hardware, e.g., busses, I/O ports, etc., may be used for communicating with a plurality of data storage devices, depending on the desired embodiment.

The method 400 also includes causing data to be stored on first ones of the data storage devices. This data may be referred to as a primary copy of the data. See operation 404. Additionally, operation 406 of method 400 includes causing storage of one or more backup copies of the data on the first and/or on second ones of the data storage devices. For the present discussion, it is assumed that a single backup copy is made. Moreover, the backup copy may be segmented in any manner known in the art. According to a preferred approach, the backup copy of the data may be a mirror copy, e.g., that is updated in real time as data is written to and/or deleted from the data storage devices. However, in other approaches, the mirror copy may be periodically updated; updated upon receiving a command from a user, an administrator, a controller, etc.; etc.

The backup copy may be stored on the same data storage devices as the primary data according to some approaches. However, in a preferred approach, the backup copy may be stored on different data storage devices (second data storage devices) than the first data storage devices storing the primary data. Storing the backup copy on different data storage devices than those storing the primary data preferably helps ensure that if a first data storage device fails, the primary data and the backup copy will not both be lost.

With continued reference to FIG. 4, method 400 additionally includes determining a probability of a failure of each of at least some of the first and/or second data storage devices. See operation 408. According to various approaches, the probability of a failure may be computed in a number of ways, as will be described in further detail below. In a preferred approach, the data storage devices may be ordered and/or ranked by their probability of failure, e.g., from most likely to fail to least likely, but is not limited thereto. In a further approach, ordering the data storage devices by their probability of failure may preferably form a priority order, which may be used to determine how many third data storage devices, e.g., "spare" storage devices, may be available and/or needed as will be described in further detail below.

Moreover, the method 400 additionally includes selecting at least one of the first and/or second data storage devices determined to have a higher probability of failure than at least one of: A) a threshold, and B) a probability of failure of another of the data storage devices e.g., as determined in the prior step. See operation 410. According to different approaches, the threshold may be set by a user, administrator, preprogrammed into the controller, etc.

Furthermore, operation 412 of method 400 includes causing a second backup copy of the data stored on the selected at least one of the first and/or second data storage devices to be stored on third ones of the data storage devices. Thus, in a preferred approach, a second backup copy of the data may be created based on the probability of failure of the first and/or second data storage devices.

In a preferred approach, the backup copy and/or the second backup copy are continuously (e.g., instantaneously) updated as the data is written to the first data storage devices. However, according to other approaches, the backup copy and/or the second backup copy may be periodically updated; updated upon receiving a command from a user, an administrator, a controller, etc.; etc.

Furthermore, the method 400 may include an optional operation 414 of determining a number of the third data storage devices available and/or needed for storing the second backup copy, and designating data storage devices from the plurality of data storage devices as the third data storage devices. As described above, according to one approach, the available and/or needed number of the third data storage devices may be determined by (e.g., based on) the probability of disk failure of the first and/or second data storage devices. Moreover, in different approaches, the number of third data storage devices available and/or needed for storing the second backup copy may be based on the size, number, etc. of the second backup copy. Similarly, compression of the existing data and/or copy thereof may be taken into account when determining the number of third data storage devices available for storing the second backup copy.

With continued reference to FIG. 4, operation 416 includes using the at least one of the first and/or second data storage devices determined to have the higher probability of failure for a designated purpose thereof after the second backup copy of the data is created. In a preferred approach, the at least one of the first and/or second data storage devices determined to have the higher probability of failure may be used until the at least one of the first and/or second data storage devices is designated as failed e.g., by an administrator, the system, etc. According to various approaches, the first and/or second data storage devices may be designated as failed when the data thereon is lost, a certain number of non-recoverable errors occur, an error rate surpasses a threshold, etc.

Furthermore, the method 400 includes an optional operation 418 of designating one of the third data storage devices as a first and/or second data storage device upon failure of the first and/or second data storage device. In a preferred approach, a third data storage device may be re-designated as its respective first and/or second data storage device upon failure thereof. For example, if a first and/or second data storage device has a second backup copy of data stored in a third data storage device, the third data storage device may preferably be re-designated as the first and/or second data storage device upon failure of the first and/or second data storage device associated therewith.

According to another approach, a third data storage device may be re-designated as a different first and/or second data storage device upon failure thereof. In one approach, the designation of the third data storage device as a first and/or second data storage device may be based on the probabilities of failure (e.g., see operation 406 of FIG. 4). For example, which is in no way intended to limit the invention, a first and/or second data storage device may not have a second backup copy stored on a third data storage device, e.g., when the probability of failure of the first and/or second data storage device is low. However, the first and/or second data storage device may fail, despite the low probability of failure. Thus, a third data storage device without data stored thereto (e.g., a spare data storage device), and having the lowest probability of failure of the pool of third storage devices and/or having the least data stored thereto, etc., may be re-designated as a first and/or second data storage device to replace the failed first and/or second data storage device.

According to yet another approach, the third data storage device storing a second backup copy associated with the first and/or second data storage device having a lowest probability of failure (e.g., of those first and/or second data storage devices associated with a second backup copy) may be selected for re-designation as a different first and/or second data storage device upon failure of any of the first and/or second data storage device. By re-designating the third data storage device that is backing up the storage device having the lowest probability of failure (in the group deemed most likely to fail), the probability of data loss is minimized.

In one approach, a third data storage device may be designated as a first and/or second data storage device to recover lost data, e.g., upon failure of both the first and second data storage device. In another approach, the data stored on a first and a second data storage device may be compared, and if the data thereon does not match, the third data storage device may be designated as a first and/or second data storage device.

According to yet another approach, a fourth, fifth, etc. data storage device may be used to store third, fourth, etc. backup copies of data on a first and/or second data storage device. In a preferred approach, fourth, fifth, etc. data storage devices may be used if the probability of failure for data storage devices corresponding to a particular backup copy of data is above a threshold. Moreover, in another approach, fourth, fifth, etc. data storage devices may be used to create additional backup copies of data that is highly valuable, from being lost (e.g., unrecoverable).

In yet another approach, the third, fourth, fifth, etc. data storage devices associated with a low probability of failure may be used, at least in part to, store backup copies of data corresponding to data storage devices having a higher probability of failure. For example, if a first data storage device has a low probability of failure, about 25%, more preferably 40%, still more preferably 50%, etc. of its corresponding second data storage device may be used to store data of another data storage device having a higher probability of failure. As a result, the remaining percentage of the second storage device may still be used to store a second backup copy of data corresponding to the first data storage device having a low probability of failure.

As alluded to above, according to various approaches, the probability of a failure for the data storage devices may be computed in a number of ways, including, but not limited to any type of procedure known in the art which would become apparent to one skilled in the art upon reading the present description. In one approach, performing recoverable and/or unrecoverable errors may preferably be used in determining the probability of a failure for a data storage device. However, in another approach, successfully performed operations (e.g., commands) may not contribute to determining the probability of a failure for data storage device, as will soon become apparent.

According to an illustrative embodiment, which is in no way intended to limit the invention, Equation 1 may be used to determine the probability of failure for a given data storage device (F_disk_vul).

$$F\_disk\_vul = \frac{\sum_{x=1}^{y}(F\_success(x) * (F\_data\_category(x) * F\_command(x) * F\_cmd\_responses(x))}{total\_I/O} \quad \text{Equation 1}$$

As illustrated in Equation 1, the probability of failure for a given data storage device (F_disk_vul) may be determined by using a running total of failures per total I/O performed to the data storage device (total_I/O) on a sliding window basis, e.g., to eliminate failures that occurred much earlier in time, and that are unlikely to represent an imminent threat. In a preferred approach, the running total of failures is acquired during operation of the data storage device (e.g., during runtime). According to various approaches, the running total of failures may be stored e.g., in a lookup table, in memory, storage management software, etc., for future use, but is not limited thereto.

Looking now to the terms of Equation 1, the success factor (F_success) may be set (e.g., by a controller) to 1 if an attempted command failed, and 0 if an attempted command actually succeeded. As described above, in a preferred approach, successfully performed commands (also referred to herein as operations) may not influence a data storage device's probability of failure. Thus, by setting the success factor to 0, successfully performed commands do not contribute to determining the probability of failure for a given data storage device.

Additionally, the data category (i.e., F_data_category(x)) represents the criticality associated with the type of operation being performed. Depending on an operation's criticality, a corresponding weight may be assigned thereto, e.g., by a user, a controller, computer program code, logic, etc. For example, write operations may be given a lower weight than read operations, as failed write operations may be more easily recoverable, e.g., by simply rewriting the data to another block. According to various approaches, operations and their corresponding weights may be stored e.g., in a lookup table, in memory, storage management software, etc., for future use, but is not limited thereto. Moreover, in other approaches, the weights of the operations may be updated, e.g., periodically, upon a user's request, when a predefined condition is met, etc., to preferably match the conditions of the data storage device.

Furthermore, Equation 1 includes a factor associated with the command being executed (F_command) as well as a factor associated with the response from the command (F_cmd_response) in determining the probability of failure for a data storage device. According to one approach, responses from the command may include SCSI ASC/ASCQ values, e.g., corresponding to weights stored in a table. For example, a response associated with an unrecoverable read error is more catastrophic than a response associated with a recoverable write failure, and therefore may correspond to a higher (e.g., larger) factor value than a recoverable write failure.

However, according to various approaches, any number of factors described and/or suggested herein, or which would be apparent to one skilled in the art upon reading the present description, may be used to determine the probability of a failure for a data storage device. In different approaches, any of the aforementioned factors may be predetermined, derived from a database, etc. Moreover, the factors may be updated periodically, upon a user's request, etc. According to a further approach, the total number of commands sent to a data storage device may be stored on the device, e.g., in a lookup table, memory, storage management software, etc., for future use.

Figure 5:
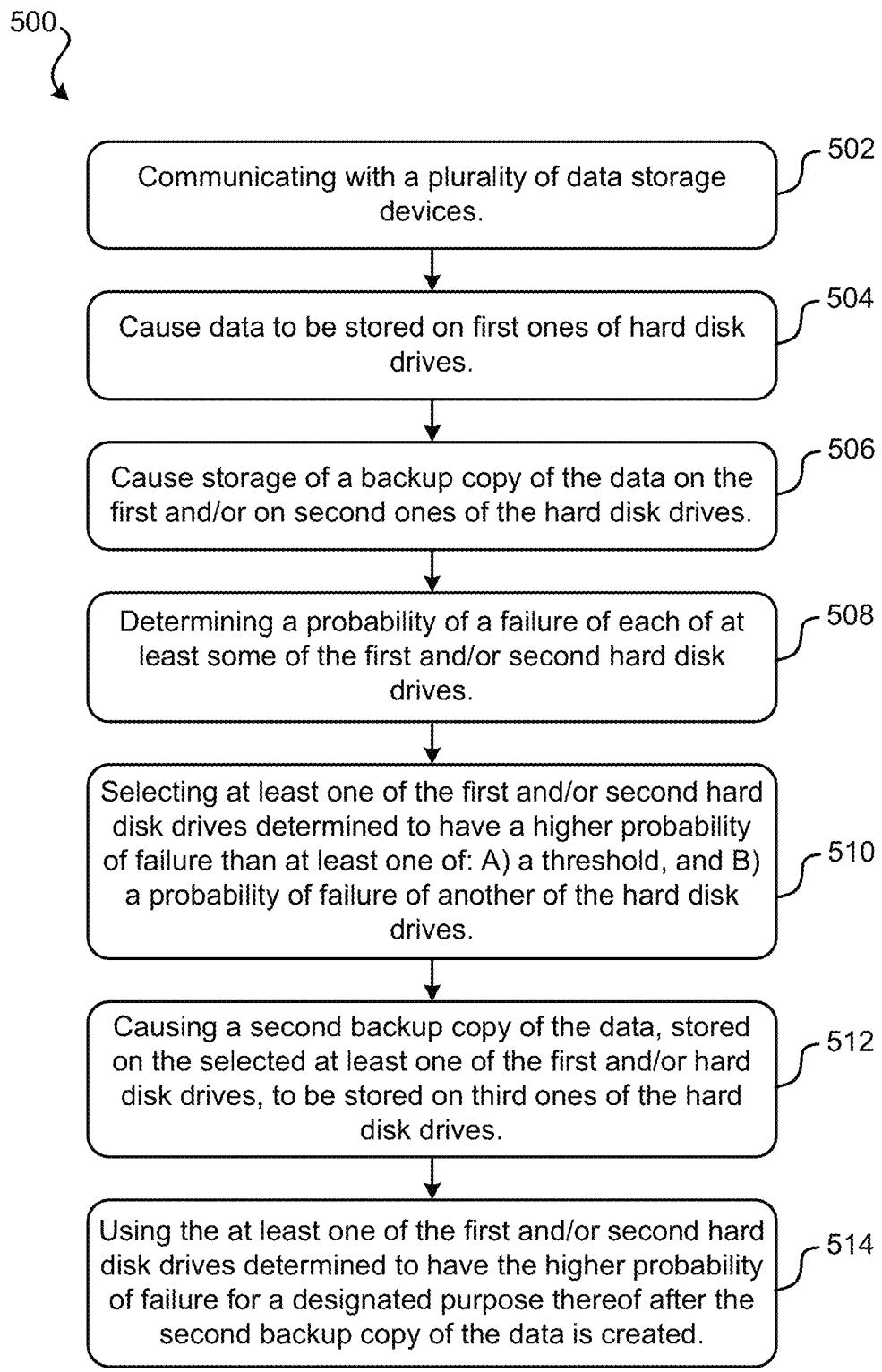
FIG. 5 illustrates a flowchart of a method in accordance with one embodiment.

FIG. 5 depicts a method 500 in accordance with one embodiment. As an option, the present method 500 may be implemented in conjunction with features from any other embodiment listed herein, such as those described with reference to the other FIGS. Of course, however, such method 500 and others presented herein may be used in various applications and/or in permutations which may or may not be specifically described in the illustrative embodiments listed herein. Further, the method 500 presented herein may be used in any desired environment. Thus FIG. 5 (and the other FIGS.) should be deemed to include any and all possible permutations.

Referring now to FIG. 5, the method 500 includes communicating with a plurality of data storage devices. See operation 502. In a preferred approach, at least some of the data storage devices may be hard disk drives. In another approach, a manager, e.g., a storage system manager as described elsewhere herein (see, e.g., 312 of FIG. 3), may communicate with the plurality of data storage devices.

The method 500 additionally includes causing data to be stored on first ones of the hard disk drives. See operation 504. Furthermore, operation 506 of method 500 includes causing storage of a backup copy of the data on the first and/or on second ones of the hard disk drives.

Moreover, the method 500 includes determining a probability of a failure of each of at least some of the first and/or second hard disk drives. See operation 508. According to various approaches, the probability of failure may be determined by using any of the approaches described and/or suggested herein.

With continued reference to FIG. 5, operation 510 includes selecting at least one of the first and/or second hard disk drives determined to have a higher probability of failure than at least one of: A) a threshold, and B) a probability of failure of another of the hard disk drives. The method 500 also includes causing a second backup copy of the data, stored on the selected at least one of the first and/or hard disk drives, to be stored on third ones of the hard disk drives. See operation 512.

The method 500 additionally includes using the at least one of the first and/or second hard disk drives determined to have the higher probability of failure for a designated purpose thereof after the second backup copy of the data is created. See operation 514.

According to an exemplary embodiment, which is in no way intended to limit the invention, a system may include 190 disk drives (e.g., data storage devices). 90 of the disk drives may be used as primary disk drives (e.g., first data storage devices), while another 90 of the disk drives may be used as mirrored disk drives (e.g., second data storage devices) to store a backup copy of the data stored on the primary disk drives. Moreover, the remaining 10 disk drives (e.g., third data storage devices) may be used to create a second backup copy of the data stored on potentially problematic primary and/or mirrored disk drives.

In a preferred approach, the first, second, third, fourth, etc. data storage devices may be hard disk drives e.g., of any type known in the art. However, according to various approaches, the data storage devices may include any of the data storage types described and/or suggested herein, or any other data storage type which would be apparent to one skilled in the art upon reading the present description. Examples include tape drives, solid state memory drives, etc. Moreover, according to different approaches, the first, second, third, fourth, etc. data storage devices may be the same, similar or different than each other, or combinations thereof, depending on the desired embodiment.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

According to one approach, basic coding techniques may be used to implement any of the approaches described and/or suggested herein, e.g., on any system that is disk aware.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
 a manager configured to communicate with a plurality of data storage devices, the manager including:
  hardware for communicating with the plurality of data storage devices;
  logic configured to cause data to be stored on first ones of the data storage devices;
  logic configured to cause storage of a backup copy of the data on at least one of the first ones of the data storage devices and second ones of the data storage devices;
  logic configured to determine a probability of a failure of each of at least some of at least one of the first data storage devices and second data storage devices;

logic configured to select at least one of the first and second data storage devices determined to have a higher probability of failure than at least one of: A) a threshold, and B) a probability of failure of another of the data storage devices;

logic configured to cause a second backup copy of the data stored on the selected at least one of the first and second data storage devices to be stored on third ones of the data storage devices; and logic configured to use the at least one of the first and second data storage devices determined to have the higher probability of failure for a designated purpose thereof after the second backup copy of the data is created.

2. The system of claim 1, wherein the first, second and third data storage devices are hard disk drives.

3. The system of claim 1, further comprising logic configured to determine a number of the third data storage devices available for storing the second backup copy, and logic configured to designate data storage devices from the plurality of data storage devices as the third data storage devices.

4. The system of claim 1, wherein the backup copy and the second backup copy are continuously updated as the data is written to the first data storage devices.

5. The system of claim 1, wherein the at least one of the first and second data storage devices determined to have the higher probability of failure is used until the at least one of the first and second data storage devices is designated as failed.

6. The system of claim 1, further comprising logic configured to designate one of the third data storage device as at least one of a first data storage device and a second data storage device upon failure of the at least one of the first data storage device and second data storage device.

7. The system of claim 6, wherein the designation of the third data storage device as the at least one of a first and a second data storage device is based on the probabilities of failure.

8. The system of claim 1, further comprising the plurality of data storage devices, at least some of the data storage devices being hard disk drives.

9. A method, comprising:
communicating with a plurality of data storage devices;
causing data to be stored on first ones of the data storage devices;
causing storage of a backup copy of the data on at least one of the first ones of the data storage devices and second ones of the data storage devices;
determining a probability of a failure of each of at least some of at least one of the first and second data storage devices;
selecting at least one of the first and second data storage devices determined to have a higher probability of failure than at least one of: A) a threshold, and B) a probability of failure of another of the data storage devices;
causing a second backup copy of the data, stored on the selected at least one of the first and second data storage devices, to be stored on third ones of the data storage devices; and
using the at least one of the first and second data storage devices determined to have the higher probability of failure for a designated purpose thereof after the second backup copy of the data is created.

10. The method of claim 9, wherein the first, second and third data storage devices are hard disk drives.

11. The method of claim 9, further comprising determining a number of the third data storage devices available for storing the second backup copy, and designating data storage devices from the plurality of data storage devices as the third data storage devices.

12. The method of claim 9, wherein the backup copy and the second backup copy are continuously updated as the data is written to the first data storage devices.

13. The method of claim 9, wherein the at least one of the first and second data storage devices determined to have the higher probability of failure is used until the at least one of the first and second data storage devices is designated as failed.

14. The method of claim 9, further comprising designating one of the third data storage device as at least one of a first data storage device and a second data storage device upon failure of the third data storage device.

15. A computer program product comprising a non-transitory computer readable storage medium having program code embodied therewith, the program code executable by a hardware processor to:
communicate, by the processor, with a plurality of data storage devices;
cause, by the processor, data to be stored on first ones of the data storage devices;
cause, by the processor, storage of a backup copy of the data on at least one of the first ones of the data storage devices and second ones of the data storage devices;
determine, by the processor, a probability of a failure of each of at least some of at least one of the first data storage devices and second data storage devices;
select, by the processor, at least one of the first and second data storage devices determined to have a higher probability of failure than at least one of: A) a threshold, and B) a probability of failure of another of the data storage devices;
cause, by the processor, a second backup copy of the data, stored on the selected at least one of the first and second data storage devices, to be stored on third ones of the data storage devices; and
use, by the processor, the at least one of the first and second data storage devices determined to have the higher probability of failure for a designated purpose thereof after the second backup copy of the data is created.

16. The computer program product of claim 15, wherein the first, second and third data storage devices are hard disk drives.

17. The computer program product of claim 15, wherein the program code is further readable/executable by the processor to determine a number of the third data storage devices available for storing the second backup copy, and logic configured to designate data storage devices from the plurality of data storage devices as the third data storage devices.

18. The computer program product of claim 15, wherein the backup copy and the second backup copy are continuously updated as the data is written to the first data storage devices.

19. The computer program product of claim 15, wherein the at least one of the first and second data storage devices determined to have the higher probability of failure is used until the at least one of the first and second data storage devices is designated as failed.

20. The computer program product of claim 15, wherein the program code is further readable/executable by the processor to designate one of the third data storage device as at least one of a first data storage device and a second data storage device upon failure of the third data storage device.

* * * * *